(12) United States Patent
Sakata et al.

(10) Patent No.: US 8,957,150 B2
(45) Date of Patent: Feb. 17, 2015

(54) AQUEOUS DISPERSION OF POLYAMIDE-BASED RUBBER-LIKE ELASTOMER AND PROCESS FOR MANUFACTURING SAME

(75) Inventors: Jun Sakata, Himeji (JP); Hiromasa Miyazaki, Himeji (JP); Taiji Matsukawa, Himeji (JP)

(73) Assignee: Sumitomo Seika Chemicals Co., Ltd., Hyogo (JP)

( * ) Notice: Subject to any disclaimer, the term of this patent is extended or adjusted under 35 U.S.C. 154(b) by 0 days.

(21) Appl. No.: 14/117,181

(22) PCT Filed: May 18, 2012

(86) PCT No.: PCT/JP2012/062748
§ 371 (c)(1),
(2), (4) Date: Nov. 12, 2013

(87) PCT Pub. No.: WO2012/161110
PCT Pub. Date: Nov. 29, 2012

(65) Prior Publication Data
US 2014/0221551 A1 Aug. 7, 2014

(30) Foreign Application Priority Data
May 24, 2011 (JP) ................................. 2011-116085

(51) Int. Cl.
*C08J 3/02* (2006.01)
*C08L 53/00* (2006.01)
*C08F 20/06* (2006.01)
*C08F 12/28* (2006.01)
*C08L 77/00* (2006.01)
*C08J 3/03* (2006.01)
*C09D 177/06* (2006.01)
*C09D 177/12* (2006.01)
*C08G 69/40* (2006.01)
*C08G 69/44* (2006.01)
*C08L 77/06* (2006.01)
*C08L 77/12* (2006.01)
*C08L 33/08* (2006.01)

(52) U.S. Cl.
CPC .. *C08L 77/00* (2013.01); *C08J 3/03* (2013.01); *C09D 177/06* (2013.01); *C09D 177/12* (2013.01); *C08G 69/40* (2013.01); *C08G 69/44* (2013.01); *C08L 77/06* (2013.01); *C08L 77/12* (2013.01); *C08J 2377/00* (2013.01); *C08L 33/08* (2013.01)
USPC ......... 524/501; 525/505; 526/317.1; 526/310

(58) Field of Classification Search
CPC ..... C08L 77/12; C08L 23/0869; C08L 33/02; C08L 77/06; C08L 77/00; C08L 33/08; C08J 3/03; C08J 2377/00; C09D 177/06; C09D 177/12; C08G 69/40; C08G 69/44
USPC ........................ 524/501, 505; 526/310, 317.1
See application file for complete search history.

(56) References Cited

U.S. PATENT DOCUMENTS

| 6,241,625 | B1 | 6/2001 | Yokota et al. |
| 2003/0181557 | A1 | 9/2003 | Suzuki |
| 2003/0232914 | A1 | 12/2003 | Devonport et al. |
| 2010/0234499 | A1 * | 9/2010 | Sugihara et al. .............. 524/156 |

FOREIGN PATENT DOCUMENTS

| CN | 1497020 A | 5/2004 |
| EP | 0 409 788 A2 | 1/1991 |
| JP | S51-23532 | 2/1976 |
| JP | S62-41229 | 2/1987 |
| JP | 2001-527594 A1 | 12/2001 |
| JP | 2003-119402 A1 | 4/2003 |
| JP | 2003-253134 A1 | 9/2003 |
| JP | 2010-90188 A1 | 4/2010 |
| JP | 2010-168423 A | 8/2010 |
| WO | WO 98/50450 A1 | 11/1998 |
| WO | WO 00/20520 A1 | 4/2000 |
| WO | WO 2008/020520 A1 | 2/2008 |

OTHER PUBLICATIONS

International Search Report for International Application No. PCT/JP2012/062748 dated Aug. 21, 2012.
Extended European Search Report dated Sep. 24, 2014 in the corresponding European patent application No. 12788778.4.

* cited by examiner

*Primary Examiner* — William Cheung
(74) *Attorney, Agent, or Firm* — Kratz, Quintos & Hanson, LLP

(57) ABSTRACT

The present invention provides an aqueous dispersion comprising a polyamide-based rubber-like elastomer emulsified and dispersed therein, wherein 0.8 to 10 parts by weight of a copolymer of ethylene with an ethylenically unsaturated carboxylic acid, relative to 100 parts by weight of the polyamide-based rubber-like elastomer is contained. The aqueous dispersion of the present invention is a novel aqueous dispersion of polyamide-based rubber-like elastomer that is excellent in storage stability at low temperatures, and that can provide processed products excellent in flexibility and heat resistance when used as a coating material.

8 Claims, No Drawings

AQUEOUS DISPERSION OF POLYAMIDE-BASED RUBBER-LIKE ELASTOMER AND PROCESS FOR MANUFACTURING SAME

This application is the national stage under 35 USC 371 of International Application No. PCT/JP2012/062748, filed May 18, 2012, which claims priority from Japanese Patent Application Number JP2011-116085 filed on May 24, 2011, the contents of which are incorporated herein by reference in its entirety.

TECHNICAL FIELD

The present invention relates to an aqueous dispersion of polyamide-based rubber-like elastomer, and a process for producing the same.

BACKGROUND ART

A polymeric rubber-like elastomer basically has either a soft polymer structure or a structure comprising a rigid polymer segment coupled with a soft polymer segment, and is used in a wide variety of industrial fields because it has rubber-like elasticity at ordinary temperatures and can be mechanically shaped due to its plasticization at high temperatures, as with thermoplastics. Typical polymeric rubber-like elastomers include those based on styrene, olefin, polyester, polyurethane, polyvinyl chloride, and polyamide. These polymeric rubber-like elastomers are usually provided as processed products produced by a mechanical operation such as extrusion molding, and when used in coating materials for various materials; adhesives or tackifiers; binders; modifiers for emulsions or the like; binders for fibers, or the like, the polymeric rubber-like elastomers are used desirably in the form of an aqueous dispersion.

Aqueous dispersions of polymeric rubber-like elastomer have been extensively studied, and an aqueous dispersion of styrene-based rubber-like elastomer has been provided as a practical product. The aqueous dispersion of styrene-based rubber-like elastomer is typically produced by mixing an organic phase solution containing a styrene-based rubber-like elastomer dissolved in an organic solvent, with an aqueous phase solution containing an emulsifier (surfactant) dissolved in an aqueous medium, and emulsifying the mixture with a homomixer or the like, followed by removing the organic solvent (see Patent Documents 1 and 2 below).

As stated above, aqueous dispersions of styrene-based rubber-like elastomer are in practical use. However, processed products obtained from the aqueous dispersions of styrene-based rubber-like elastomer are generally inferior in abrasion resistance, flex resistance, oil resistance, and weather resistance.

A polyamide-based rubber-like elastomer, on the other hand, can provide processed products that are not only excellent in these properties, i.e., abrasion resistance, flex resistance, oil resistance, and weather resistance, but also excellent in transparency, flexibility, impact strength, tensile strength, chemical resistance, and heat resistance, and further has an advantage in that its processed products can be made thin-walled because it exhibits higher stress upon deformation than other polymeric rubber-like elastomers of the same rigidity, and is thus useful, for example, as a material for producing packaging films, automobile parts, sporting goods, and medical devices. Accordingly, there have been demands for aqueous dispersions of polyamide-based rubber-like elastomer; however, such aqueous dispersions of polyamide-based rubber-like elastomer have not been put in practical use so far, and remain to be realized.

Examples of aqueous dispersions of polyamide-based rubber-like elastomer and their production processes considered so far include a process in which a polyamide-based rubber-like elastomer is emulsified and dispersed in the presence of an aqueous medium and a surfactant (see Patent Documents 3 and 4 below).

However, aqueous dispersions of polyamide-based rubber-like elastomer obtained by such a process are not satisfactory in terms of storage stability, particularly when stored at a low temperature. Moreover, for use as a coating material, further improvement is desired in their heat resistance and mechanical properties.

CITATION LIST

Patent Literature

Patent Document 1: JP51-023532A
Patent Document 2: JP2003-253134A
Patent Document 3: WO 2000/020520
Patent Document 4: JP2001-527594A

SUMMARY OF INVENTION

Technical Problem

The present invention has been completed in light of the above-described status of the prior art. Thus, a main object thereof is to provide a novel aqueous dispersion of polyamide-based rubber-like elastomer that is excellent in storage stability at low temperatures, and that can provide processed products excellent in flexibility and heat resistance even when used as a coating material.

Solution to Problem

The present inventors conducted extensive research to achieve the above object. As a result, the present inventors found that when a specific amount of a copolymer of ethylene with an ethylenically unsaturated carboxylic acid is added to an aqueous dispersion of polyamide-based rubber-like elastomer that is emulsified and dispersed in an aqueous medium, the resulting dispersion exhibits improved storage stability at low temperatures. When the resulting dispersion is used as a coating material, only the surface of a substrate can be uniformly coated, and permeation of the dispersion into the substrate is suppressed, thus improving heat resistance and flexibility. The present inventors further found that when an acrylic acid-based crosslinked polymer is optionally added to the aqueous dispersion together with such a copolymer of ethylene with an ethylenically unsaturated carboxylic acid, the structural viscosity coefficient of the resulting aqueous dispersion can be adjusted to a suitable value, thereby achieving a further improvement in mechanical properties, such as heat resistance and flexibility. Moreover, the present inventors found that adjusting the pH of the aqueous dispersion attains an excellent storage stability at low temperatures. The present invention was accomplished as a result of further research based on these findings.

The present invention provides the following aqueous dispersions of polyamide-based rubber-like elastomer and processes for producing the same.

Item 1. An aqueous dispersion of polyamide-based rubber-like elastomer comprising an aqueous dispersion containing a polyamide-based rubber-like elastomer emulsified and dispersed therein, the aqueous dispersion comprising a copolymer of ethylene with an ethylenically unsaturated carboxylic acid in an amount of 0.8 to 10 parts by weight per 100 parts by weight of the polyamide-based rubber-like elastomer.

Item 2. The aqueous dispersion of polyamide-based rubber-like elastomer according to Item 1, wherein the aqueous dispersion is one prepared by emulsifying and dispersing the polyamide-based rubber-like elastomer in an aqueous medium in the presence of the aqueous medium and a surfactant.

Item 3. The aqueous dispersion of polyamide-based rubber-like elastomer according to Item 1 or 2, wherein the polyamide-based rubber-like elastomer is at least one copolymer selected from the group consisting of a polyether block amide copolymer and a polyether ester block amide copolymer.

Item 4. The aqueous dispersion of polyamide-based rubber-like elastomer according to any one of Items 1 to 3, further comprising an acrylic acid-based crosslinked polymer.

Item 5. The aqueous dispersion of polyamide-based rubber-like elastomer according to any one of Items 1 to 4, having a pH of 9 to 11 at 25° C.

Item 6. The aqueous dispersion of polyamide-based rubber-like elastomer according to any one of Items 1 to 5, having a viscosity of 600 to 3,000 mPa·s at 25° C., and having a structural viscosity coefficient of 1.5 to 2.7, the structural viscosity coefficient being defined by the following formula:

Structural Viscosity Coefficient=Viscosity at 6 rpm/Viscosity at 60 rpm, wherein each viscosity is measured with a B-type viscometer at 25° C. at a rotation speed of 60 rpm or 6 rpm.

Item 7. A process for producing an aqueous dispersion of polyamide-based rubber-like elastomer, the process comprising the steps of:

preparing a mixture comprising a polyamide-based rubber-like elastomer, a surfactant, and an aqueous medium;

heating the obtained mixture to a temperature equal to or higher than the softening temperature of the polyamide-based rubber-like elastomer and emulsifying the mixture; and adding to the obtained emulsified solution a copolymer of ethylene with an ethylenically unsaturated carboxylic acid in an amount of 0.8 to 10 parts by weight per 100 parts by weight of the polyamide-based rubber-like elastomer.

Item 8. A process for producing an aqueous dispersion of polyamide-based rubber-like elastomer, the process comprising the steps of:

mixing an organic phase solution comprising a polyamide-based rubber-like elastomer dissolved in an organic solvent with an aqueous phase solution comprising a surfactant dissolved in an aqueous medium to thereby obtain an emulsified turbid solution;

evaporating off the organic solvent from the emulsified turbid solution to obtain an emulsified solution; and adding to the obtained emulsified solution a copolymer of ethylene with an ethylenically unsaturated carboxylic acid in an amount of 0.8 to 10 parts by weight per 100 parts by weight of the polyamide-based rubber-like elastomer.

Hereinafter, an aqueous dispersion of polyamide-based rubber-like elastomer of the present invention and its production process will be specifically described.

Aqueous Dispersion of Polyamide-Based Rubber-Like Elastomer

The aqueous dispersion of polyamide-based rubber-like elastomer of the present invention comprises an aqueous dispersion containing a polyamide-based rubber-like elastomer emulsified and dispersed therein, wherein 0.8 to 10 parts by weight of a copolymer of ethylene with an ethylenically unsaturated carboxylic acid relative to 100 parts by weight of the polyamide-based rubber-like elastomer is contained. Hereinafter, the aqueous dispersion of polyamide-based rubber-like elastomer of the present invention will be specifically described.

(i) Aqueous Medium

The aqueous dispersion of polyamide-based rubber-like elastomer of the present invention comprises a polyamide-based rubber-like elastomer that is emulsified and dispersed in an aqueous medium. The aqueous medium for the aqueous dispersion is typically water, and various kinds of water, such as tap water, industrial water, ion-exchanged water, deionized water, and purified water, can be used. In particular, deionized water and purified water are preferable. Moreover, a pH adjuster, an antifoam agent, a viscosity modifier, an antifungal agent, etc., can be optionally added to the water, as necessary, insofar as the object of the present invention is not impaired.

(ii) Polyamide-Based Rubber-Like Elastomer

Examples of polyamide-based rubber-like elastomers to be used for the aqueous dispersion of the present invention include, but are not particularly limited to, a polyamide-based rubber-like elastomer that has a structure comprising a rigid polymer segment coupled with a soft polymer segment, the rigid polymer segment including a crystalline polyamide block that has a high melting point, and the soft polymer segment including an amorphous polyether block that has a low glass transition temperature. Examples of the constituents of the polyamide block in the rigid polymer segment include: lactam compounds, such as caprolactam, capryl lactam, enantholactam, and laurolactam; aminocarboxylic acid compounds, such as ω-aminocaproic acid, ω-aminoenanthic acid, ω-aminocaprylic acid, ω-aminoperconic acid, ω-aminocapric acid and 11-aminoundecanoic acid; and salts of a diamine compound with a dicarboxylic acid compound, examples of diamine compounds including ethylene diamine, triethylene diamine, tetraethylenediamine, and hexamethylene diamine, and examples of dicarboxylic acid compounds including oxalic acid, succinic acid, glutaric acid, adipic acid, pimelic acid, sebacic acid, terephthalic acid, and isophthalic acid. Two or more of these constituents may be used. Examples of the constituents of the polyether block in the soft polymer segment include: glycol compounds, such as polyethylene oxide glycol, polypropylene oxide glycol, polytetramethylene oxide glycol and polyhexamethylene oxide glycol; and diamine compounds, such as polyether diamine. Two or more of these constituents may be used.

Specific examples of the above-described polyamide-based rubber-like elastomer include several types of those that differ in the molecular structure of the binding portion, i.e., the binding form of the polyamide block and the polyether block, and typically include a polyether block amide copolymer having the binding form of "(polyamide block)-CO—NH-(polyether block)," and a polyether ester block amide copolymer having the binding form of "(polyamide block)-CO—O-(polyether block)." The polyamide-based rubber-like elastomer may include two or more binding forms.

A commercially available polyamide-based rubber-like elastomer, or a suitably produced polyamide-based rubber-like elastomer may be used. Examples of processes for producing a polyamide-based rubber-like elastomer include a process comprising the steps of: reacting at least one compound selected from a lactam compound, an aminocarboxylic acid compound, and a diamine compound with a dicarboxylic acid to prepare a polyamide block substantially having carboxyl groups at both terminals thereof; adding to this polyamide block a glycol compound, such as polyethylene oxide glycol, or a diamine compound, such as polyether diamine; and subjecting the resulting mixture to reaction by heating.

(iii) Copolymer of Ethylene with an Ethylenically Unsaturated Carboxylic Acid

Examples of copolymers of ethylene with an ethylenically unsaturated carboxylic acid include a random copolymer of ethylene with an ethylenically unsaturated carboxylic acid, a copolymer comprising an unsaturated carboxylic acid grafted onto polyethylene, and a terpolymer further comprising a third constituent.

Examples of ethylenically unsaturated carboxylic acids include unsaturated carboxylic acids typically having 6 or fewer carbon atoms, such as acrylic acid, methacrylic acid, crotonic acid, and isocrotonic acid; and dicarboxylic acids, such as maleic acid, fumaric acid, and itaconic acid. Among these, acrylic acid and methacrylic acid are preferable.

In the copolymer of ethylene with an ethylenically unsaturated carboxylic acid, although the ratio of an ethylenically unsaturated carboxylic acid to ethylene used as monomers (copolymerization ratio) are not particularly limited, a preferable copolymer comprises an ethylenically unsaturated carboxylic acid in an amount of about 1 wt % or more and less than about 40 wt %, with the total weight of ethylene and an ethylenically unsaturated carboxylic acid being 100 wt %. In particular, an ethylenically unsaturated carboxylic acid in an amount of about 5 wt % or more and less than about 25 wt % is more preferable. When the ratio of an unsaturated carboxylic acid is too small, the obtained aqueous dispersion of polyamide-based rubber-like elastomer may become less stable when left to stand. On the other hand, when the ratio of an unsaturated carboxylic acid is too large, the obtained processed product may have less flexibility.

A copolymer of ethylene with an ethylenically unsaturated carboxylic acid preferably has a weight-average molecular weight of about 300 to 1,000,000.

The amount of a copolymer of ethylene with an ethylenically unsaturated carboxylic acid to be used is 0.8 to 10 parts by weight, and preferably 2 to 8 parts by weight, per 100 parts by weight of a polyamide-based rubber-like elastomer. When a copolymer of ethylene with an ethylenically unsaturated carboxylic acid is used in an amount of less than 0.8 parts by weight, the stability of the dispersion left to stand decreases, particularly at low temperatures. On the other hand, when a copolymer of ethylene with an ethylenically unsaturated carboxylic acid is used in an amount of more than 10 parts by weight, an aqueous dispersion with excellent dispersion stability can be obtained; however, processed products obtained through applying the aqueous dispersion become unsatisfactory in mechanical properties, such as flexibility.

Although the form of the copolymer of ethylene with an ethylenically unsaturated carboxylic acid used in the present invention is not particularly limited, an aqueous dispersion form is typically preferable.

To prepare an aqueous dispersion of a copolymer of ethylene with an ethylenically unsaturated carboxylic acid, various methods are available, such as a method using a surfactant, a self-emulsification method, or a mechanically dispersing method.

Examples of surfactants to be typically used include anionic surfactants, non-ionic surfactants, etc., and these surfactants may be used in a combination thereof, or in a combination with a basic substance.

In a copolymer of ethylene with an ethylenically unsaturated carboxylic acid, when the copolymerization ratio of the unsaturated carboxylic acid is 10 wt % or more, the self-emulsification method is applicable. In this case, the copolymer is neutralized with a basic substance to achieve dispersion.

Examples of basic substances used for neutralization include: alkali metal compounds, such as lithium hydroxide, sodium hydroxide, and potassium hydroxide; ammonia; and amines, such as morpholine, triethylamine, and amino alcohols. Among these, ammonia is suitably used due to the excellent water resistance imparted to processed products obtained using the aqueous dispersion of the present invention.

In the mechanical dispersion method, when the copolymerization ratio of an unsaturated carboxylic acid is about 10 wt % or less, a surfactant is supplementarily used.

The copolymer of ethylene with an ethylenically unsaturated carboxylic acid used in the present invention is preferably an ammonium salt of ethylene/acrylic acid copolymer that is obtained by self-emulsifying an ethylene/acrylic acid copolymer using ammonia, for example.

(iv) Acrylic Acid-Based Crosslinked Polymer

The aqueous dispersion of polyamide-based rubber-like elastomer of the present invention may further comprise an acrylic acid-based crosslinked polymer, if so desired. An acrylic acid-based crosslinked polymer, when added, imparts a suitable viscosity to the resulting aqueous dispersion. Thus, the resulting aqueous dispersion, when used as a coating material, affords processed products that exhibit more excellent physical properties, such as heat resistance and flexibility.

The acrylic acid-based crosslinked polymer used in the present invention is a crosslinked polymer mainly comprising monomeric structural units derived from (meth)acrylic acid, i.e., "methacrylic acid or acrylic acid." Examples of monomeric structural units include: alkali metal salts of (meth)acrylic acid, such as sodium (meth)acrylate and potassium (meth)acrylate; amine salts of (meth)acrylic acid, such as monoethanolamine salts of (meth)acrylic acid, diethanolamine salts of (meth)acrylic acid and triethanolamine salts of (meth)acrylic acid; and ammonium salts of (meth)acrylic acid. These monomeric structural units may be used singly or in a combination of two or more thereof.

Acrylic acid-based crosslinked polymers, when formed in a 0.2 wt % aqueous solution adjusted to a pH of 7.0 using sodium hydroxide, have a viscosity of preferably about 1,000 to 100,000 mPa·s, and more preferably about 20,000 to 60,000 mPa·s, as measured with a B type rotational viscometer (product manufactured by Brookfield Engineering Laboratories Inc., U.S.) at 25° C. at a rotation speed of 20 rpm.

Such acrylic acid-based crosslinked polymers may be those that are commercially available under the trademark of Carbopol 980, 981, 2984, 5984, and 1382 manufactured by B.F. Goodrich, AQUPEC HV-501E, HV-504E, HV-505E, and HV-805EG manufactured by Sumitomo Seika Chemicals Co., Ltd., Junron PW-110 and PW-111 manufactured by Nihon Junyaku Co., Ltd., Aqua Rick AS manufactured by Nippon Shokubai Co., Ltd. etc. Crosslinked sodium polyacrylate to be used may be one that is commercially available under the trademark of Rheojic 250H and 252L manufactured by Nihon Junyaku Co., Ltd., and Aqua Rick MH manufactured by Nippon Shokubai Co., Ltd.

The amount of an acrylic acid-based crosslinked polymer to be used is not particularly limited, but is preferably about 0.1 to 2 parts by weight, and more preferably about 0.3 to 0.9 parts by weight, per 100 parts by weight of a polyamide-based rubber-like elastomer with a view to sufficiently bringing about the effects associated with the use of the acrylic acid-based crosslinked polymer.

When too small an amount of the acrylic acid-based crosslinked polymer is used, there is a possibility that the aqueous dispersion may have an excessively low viscosity and the structural viscosity coefficient thereof may not become a suitable value. Such an aqueous dispersion of polyimide-based rubber-like elastomer, when made into a coating material, applied to a fabric or the like, and subjected to processing, may excessively sink into the fabric or the like, and the mechanical property-improving effect attributed to the use of the acrylic acid-based crosslinked polymer may not be sufficiently produced.

On the other hand, too large an amount of the acrylic acid-based crosslinked polymer may result in an aqueous dispersion having an excessively high viscosity, and the thus-produced aqueous dispersion may be not easy to handle. Further, there may be a tendency for an uneven coating to form on obtained processed products due to an unsuitable structural viscosity coefficient.

(v) Antioxidant

The aqueous dispersion of polyamide-based rubber-like elastomer of the present invention may further comprise an antioxidant, if so desired, insofar as the object of the present invention is not impaired. An antioxidant, when added, enhances heat resistance, to thereby curb the decline in mechanical properties after heating treatment.

The type of antioxidant is not particularly limited, and various types of antioxidants, such as a hindered phenol antioxidant, a sulfur-containing antioxidant, a phosphorus-containing antioxidant, and an amine-based antioxidant, can be used.

Examples of hindered phenol antioxidants to be used include known hindered phenol antioxidants, and typically triethylene glycol-bis[3-(3-t-butyl-5-methyl-4-hydroxyphenyl)propionate], 1,6-hexanediol-bis-[3-(3,5-di-t-butyl-4-hydroxyphenyl)propionate], N,N'-hexamethylenebis(3,5-di-t-butyl-4-hydroxy-hydrocinnamide), pentaerythrityl-tetrakis[3-(3,5-di-t-butyl-4-hydroxyphenyl)propionate], octadecyl-3-(3,5-di-t-butyl-4-hydroxyphenyl)propionate, 1,3,5-trimethyl-2,4,6-tris(3,5-di-t-butyl-4-hydroxybenzyl)benzene, 2,6-di-t-butyl-4-ethylphenol, 2,2'-methylenebis(4-methyl-6-t-butylphenol), 4,4'-thio-bis(3-methyl-6-t-butylphenol), 4,4'-butylidene-bis(3-methyl-6-t-butylphenol), 1,1,3-tris(2-methyl-4-hydroxy-5-t-butylphenyl)butane, 1,3,5-tris(4-hydroxybenzyl)benzene, tetrakis[methylene-3-(3,5'-di-t-butyl-4'-hydroxyphenyl propionate)]methane, etc. Among these, 1,6-hexanediol-bis-[3-(3,5-di-t-butyl-4-hydroxyphenyl)propionate], pentaerythrityl-tetrakis[3-(3,5-di-t-butyl-4-hydroxyphenyl)propionate], N,N'-hexamethylenebis(3,5-di-t-butyl-4-hydroxy-hydrocinnamide) and 1,3,5-trimethyl-2,4,6-tris(3,5-di-t-butyl-4-hydroxybenzyl)benzene are particularly preferable.

Examples of sulfur-containing antioxidants include dilauryl thiodipropionate, dimyristyl thiodipropionate, distearyl thiodipropionate, and pentaerythritol-tetrakis(β-laurylthio propionate). Among these, pentaerythritol-tetrakis(β-laurylthio propionate) is particularly preferable.

Examples of phosphorus-containing antioxidants to be used include tris(2,4-di-tert-butylphenyl)phosphite, bis[2,4-bis(1,1-dimethylethyl)-6-methylphenyl]ethyl ester of phosphorous acid, tetrakis(2,4-di-tert-butylphenyl)[1,1-biphenyl]-4,4-diyl bisphosphonite, bis(2,4-di-t-butylphenyl)pentaerythritol-di-phosphite, bis(2,6-di-t-butyl-4-methylphenyl)pentaerythritol-di-phosphite, and bis(2,4-dicumylphenyl)pentaerythritol-di-phosphite.

Examples of amine-based antioxidants to be used include octylated diphenylamine, 2,4-bis-(n-octylthio)-6-(4-hydroxy-3,5-di-t-butylanilino)-1,3,5-triazine, phenyl-1-naphthylamine, poly(2,2,4-trimethyl-1,2-dihydroquinoline, and N,N'-diphenyl-p-phenylenediamine.

These antioxidants may be used in a combination of two or more. Using these antioxidants in a combination of two or more further enhances heat resistance.

The amount of an antioxidant to be used is preferably about 0.01 to 10 parts by weight, more preferably about 0.05 to 8 parts by weight, and particularly more preferably about 0.1 to 5 parts by weight, per 100 parts by weight of a polyamide-based rubber-like elastomer. When too large an amount of an antioxidant is used, the antioxidant has a tendency to bleed, thereby resulting in a damaged appearance, e.g., a clouded product surface, and using too much antioxidant is not economical either. On the other hand, when too small an amount of an antioxidant is used, the effect brought about by the antioxidant is not sufficient, and the heat resistance-enhancing effect is thus not fully produced.

(vi) Other Components

The aqueous dispersion of polyamide-based rubber-like elastomer of the present invention may further comprise a polymeric dispersion stabilizer, such as polyvinyl alcohol, hydroxyethylcellulose, methylcellulose, hydroxypropylcellulose, polyacrylic acid salt, polyacrylic acid ester salt, and sodium alginate, as necessary, insofar as the object of the present invention is not impaired.

(vii) Physical Properties of Aqueous Dispersion

There is no restriction on the pH of the aqueous dispersion of polyamide-based rubber-like elastomer of the present invention, but the pH is preferably about 9 to 11 at 25° C. with a view to having an excellent stability of the aqueous dispersion, particularly at low temperatures. When the pH is too low, the aqueous dispersion exhibits a high viscosity, thereby becoming difficult to handle. An excessively high pH is also not preferable because the polyamide-based rubber-like elastomer tends to hydrolyze when the aqueous dispersion having a high pH is left to stand for a long period of time.

Examples of pH adjustors used for adjusting the pH of the aqueous dispersion of polyamide-based rubber-like elastomer include, but are not particularly limited to, alkali metal compounds, such as lithium hydroxide, sodium hydroxide, and potassium hydroxide; ammonia; and amines, such as morpholine, triethylamine, and amino alcohol.

The aqueous dispersion of polyamide-based rubber-like elastomer of the present invention has a viscosity of preferably about 600 to 3,000 mPa·s, and more preferably about 800 to 1,500 mPa·s at 25° C., although the viscosity is not particularly limited thereto. Herein, the viscosity is measured with a B-type rotational viscometer at a rotation speed of 60 rpm.

When the aqueous dispersion has an excessively low viscosity, handling thereof becomes difficult. Furthermore, when the aqueous dispersion of polyamide-based rubber-like elastomer is, for example, applied to a fabric or the like as a coating material and subjected to processing, the aqueous dispersion of polyamide-based rubber-like elastomer may excessively sink into the fabric or the like, and the thus-obtained processed products may not have excellent mechanical properties. On the other hand, when the aqueous dispersion has an excessively high viscosity, handling thereof becomes difficult. Furthermore, when such an aqueous dispersion is, for example, applied as a coating material to a fabric or the like and subjected to processing, such an aqueous dispersion is difficult to apply evenly onto the fabric, thereby tending to produce an unevenly coated product.

The aqueous dispersion of polyamide-based rubber-like elastomer of the present invention has a structural viscosity coefficient of preferably 1.5 to 2.7, and more preferably 2 to 2.5, at 25° C. The structural viscosity coefficient is represented by the formula shown below. Setting the structural viscosity coefficient so as to fall within this range further enhances the mechanical properties, such as heat resistance and flexibility. For adjusting the structural viscosity coefficient to the above range, it suffices, for example, to add a predetermined amount of a copolymer of ethylene with an ethylenically unsaturated carboxylic acid and to suitably adjust the amount of an acrylic acid-based crosslinked polymer to be added. Typically, the structural viscosity coefficient shows a tendency to increase as the amount of an acrylic acid-based crosslinked polymer added increases.

Herein, the structural viscosity coefficient is determined by the following formula, based on the viscosity values measured with a B-type viscometer at a rotation speed of 60 rpm and 6 rpm at 25° C.

Structural viscosity coefficient=Viscosity at 6 rpm/ Viscosity at 60 rpm

When the structural viscosity coefficient represented by the above formula is too low, the obtained processed product may not have excellent mechanical properties. On the other hand, when the structural viscosity coefficient is too high, handling of the aqueous dispersion becomes difficult, and the obtained processed product may not have excellent mechanical properties either.

Process for Producing an Aqueous Dispersion of Polyamide-Based Rubber-Like Elastomer The process for producing an aqueous dispersion of polyamide-based rubber-like elastomer of the present invention is not particularly limited insofar as a copolymer of ethylene with an ethylenically unsaturated carboxylic acid, and optionally an acrylic acid-based crosslinked polymer, can be uniformly dissolved or dispersed in an emulsified solution having a polyamide-based rubber-like elastomer emulsified and dispersed in an aqueous medium.

Examples of processes for producing the aqueous dispersion of the present invention include a process comprising the steps of dispersing in an aqueous medium a polyamide-based rubber-like elastomer powder that is obtained by pulverizing a polyamide-based rubber-like elastomer using a mechanical-milling technique, a freeze-milling technique, a wet-milling technique, or the like, and mixing the resulting emulsified solution with a copolymer of ethylene and an ethylenically unsaturated carboxylic acid, optionally with an acrylic acid-based crosslinked polymer; and a process comprising the steps of preparing an emulsified solution of polyamide-based rubber-like elastomer using a surfactant, and mixing the obtained emulsified solution with a copolymer of ethylene and an ethylenically unsaturated carboxylic acid, optionally with an acrylic acid-based crosslinked polymer.

(i) Process for Preparing an Emulsified Solution of Polyamide-Based Rubber-Like Elastomer Hereinafter, typical examples of processes for preparing an emulsified solution of polyamide-based rubber-like elastomer to be used for producing the aqueous dispersion of polyamide-based rubber-like elastomer of the present invention will be described.

Preparation Process 1

In Preparation Process 1, first, a polyamide-based rubber-like elastomer, a surfactant, and an aqueous medium are placed in a container to prepare a mixture.

The amount of a polyamide-based rubber-like elastomer to be used is not particularly limited, but is preferably about 5 to 80 wt %, and more preferably about 25 to 50 wt %, based on setting the total amount of the finally obtained aqueous dispersion of polyamide-based rubber-like elastomer of the present invention to 100%. Too small an amount of a polyamide-based rubber-like elastomer may lower the productivity and reduce practicality, although the obtained aqueous dispersion exhibits excellent dispersion stability. On the other hand, too large an amount of a polyamide-based rubber-like elastomer may result in an aqueous dispersion having unsatisfactory dispersion stability.

The type of surfactant to be used is not particularly limited, and examples of usable surfactants include anionic surfactants and nonionic surfactants. Examples of anionic surfactants include polyoxyalkylene alkyl ether sulfates, polyoxyalkylene alkylphenyl ether sulfates, alkylbenzene sulfonates, alkylnaphthalene sulfonates, alkyl diphenyl sulfonates, α-olefin sulfonates, alkyl sulfate ester salts, naphthalene-sulfonate formalin condensates, dialkyl sulfosuccinates, polyoxyethylene alkyl ether acetates, rosin acid salts, and fatty acid salts.

Examples of nonionic surfactants include polyethylene glycols, ethylene oxide/propylene oxide copolymers, polyoxyethylene alkyl ethers, polyoxyethylene alkylphenyl ethers, polyoxyethylene alkyl thioethers, polyoxyethylene sorbitan fatty acid monoesters, polyoxyethylene alkylamides, and polyglycerin esters.

Among these, from the standpoint of excellent emulsification and dispersion properties and excellent heat resistance, polyethylene glycols, ethylene oxide/propylene oxide copolymers, polyoxyethylene alkyl ethers, polyoxyethylene alkylphenyl ethers, polyoxyethylene sorbitan fatty acid monoesters, etc., are preferable, with ethylene oxide/propylene oxide copolymers being particularly preferred.

The surfactants may be used in a combination of two or more. In such a case, an anionic surfactant may be used in combination with a nonionic surfactant.

The amount of a surfactant to be used is preferably about 1 to 20 parts by weight, and more preferably about 1 to 12 parts by weight, per 100 parts by weight of a polyamide-based rubber-like elastomer. Too small an amount of a surfactant may result in an aqueous dispersion with unsatisfactory stability. On the other hand, too large an amount of a surfactant may facilitate emulsification and give a stable aqueous dispersion; however, processed products formed from the thus-obtained aqueous dispersion may lack some physical properties that can ordinarily be expected from the polyamide-based rubber-like elastomer. In particular, surfactant bleeding may occur on the surface of the processed products, or the clarity of the processed products may be impaired.

The container used for preparing the mixture is preferably a pressure-resistant container equipped with a heating means for heating the obtained mixture to a temperature equal to or higher than the temperature at which the polyamide-based rubber-like elastomer softens in an aqueous medium, and a mixing means capable of applying a shearing force to the content. For example, a pressure-resistant autoclave equipped with a mixer is preferable.

Subsequently, the above mixture is heated to a temperature equal to or higher than the softening temperature of the polyamide-based rubber-like elastomer, followed by stirring, and then cooled to room temperature, thereby giving an emulsified solution of the polyimide-based rubber-like elastomer.

Preparation Process 2

In Preparation Process 2, first, an organic phase solution comprising a polyamide-based rubber-like elastomer dissolved in an organic solvent is mixed with an aqueous phase solution comprising a surfactant dissolved in an aqueous medium to prepare an emulsified turbid solution.

Examples of organic solvents used for preparing the organic phase solution are not particularly limited, and include aromatic hydrocarbon solvents, such as toluene, xylene, ethylbenzene, and tetralin; alicyclic hydrocarbon solvents, such as cyclohexane and decaline; aliphatic hydrocarbon solvents, such as hexane and heptane; halogenated hydrocarbon solvents, such as chloroform and 1,2-dichloroethane; and alcohol solvents, such as methanol, ethanol, isopropyl alcohol, and t-butanol. These organic solvents may be used in a combination of two or more.

In view of the excellent ability to dissolve the polyamide-based rubber-like elastomer, an organic solvent to be used is preferably a solvent mixture comprising an alcohol solvent and at least one solvent (hydrocarbon solvent) selected from the group consisting of aromatic hydrocarbon solvents and alicyclic hydrocarbon solvents. The proportions of a hydrocarbon solvent and an alcohol solvent in the solvent mixture are not particularly limited, but the alcohol solvent is used in an amount of preferably about 25 to 100 parts by weight, and more preferably 40 to 60 parts by weight, per 100 parts by weight of the hydrocarbon solvent.

The amount of an organic solvent to be used for preparing an organic phase solution is not particularly limited, but the organic solvent is preferably used in such an amount that the concentration of the polyamide-based rubber-like elastomer in the organic phase solution becomes about 3 to 30 wt %. Too high a concentration of a polyamide-based rubber-like elastomer in an organic phase solution makes it difficult for the polyamide-based rubber-like elastomer to uniformly dissolve in the organic phase solution, thereby possibly resulting in a large particle size of the polyamide-based rubber-like elastomer in the obtained aqueous dispersion of the polyamide-based rubber-like elastomer. On the other hand, too low a concentration of a polyimide-based rubber-like elastomer does not bring about effects that correspond to the amount of organic solvent used, and is therefore uneconomical.

The organic phase solution is prepared by adding a polyamide-based rubber-like elastomer to an organic solvent to dissolve it in the organic solvent. The temperature for preparing an organic phase solution is not particularly limited, but it is generally preferable to control the temperature to be 100° C. or lower.

The aqueous phase solution is prepared by adding a surfactant to an aqueous medium to dissolve it in the aqueous medium. The amount of the surfactant relative to the aqueous medium is not particularly limited, but the surfactant is preferably used in such an amount that the concentration of the surfactant in the aqueous medium becomes about 0.1 to 50 wt %.

As with Preparation Process 1, the type of surfactant to be used is not particularly limited. However, in Preparation Process 2, polyoxyalkylene alkyl ether sulfates and fatty acid salts are particularly preferable from the standpoint of their reasonable price and availability as well as their particularly excellent emulsifying and dispersing properties and stability.

The proportions of an organic phase solution and an aqueous phase solution should be determined such that the proportion of a surfactant relative to a polyamide-based rubber-like elastomer falls within the range described in Preparation Process 1. Generally, the aqueous phase solution is used in an amount of preferably 20 to 500 parts by weight, and more preferably 25 to 200 parts by weight, per 100 parts by weight of the organic phase solution. Too small a proportion of an aqueous phase solution may result in unsatisfactory emulsification, or the thus-obtained emulsified turbid solution may have a significantly high viscosity. On the other hand, too large a proportion of an aqueous phase solution may lower productivity and reduce practicality, although emulsification is possible.

Examples of processes for preparing an emulsified turbid solution by mixing an organic phase solution with an aqueous phase solution are not particularly limited, and include a process comprising the step of mixing an organic phase solution with an aqueous phase solution by stirring, using emulsification equipment such as a homomixer or a colloid mill, and a process comprising the step of mixing and dispersing an organic phase solution and an aqueous phase solution using an ultrasonic dispersion machine or the like. The former process is preferable in general. An emulsified turbid solution is prepared at a temperature preferably in the range of 5 to 70° C., although the temperature is not limited thereto.

Subsequently, the organic solvent is evaporated off from the emulsified turbid solution prepared according to the above procedure, thereby giving an emulsified solution of polyamide-based rubber-like elastomer. The organic solvent can be evaporated from the emulsified turbid solution by following a common procedure, e.g., removing the organic solvent by heating the emulsified turbid solution under reduced pressure. If desired, the obtained emulsified solution of polyamide-based rubber-like elastomer may be suitably concentrated by an operation, such as concentration by heating, centrifugation, or wet separation. By doing so, the concentration of the polyamide-based rubber-like elastomer can be adjusted depending on the intended use.

(ii) Process for Producing an Aqueous Dispersion of Polyamide-Based Rubber-Like Elastomer To the emulsified solution of polyamide-based rubber-like elastomer obtained according to the above procedure, a copolymer of ethylene with an ethylenically unsaturated carboxylic acid, and optionally an acrylic acid-based crosslinked polymer, are added, and uniformly dissolved or dispersed, thereby giving an aqueous dispersion of polyamide-based rubber-like elastomer of the present invention.

There is no restriction on the method for adding a copolymer of ethylene with an ethylenically unsaturated carboxylic acid, and optionally an acrylic acid-based crosslinked polymer, and any methods can be used insofar as these components are uniformly dispersed in the emulsified solution of polyamide-based rubber-like elastomer obtained by the above-described procedure. For example, after mixing the emulsified solution of polyamide-based rubber-like elastomer and a copolymer of ethylene with an ethylenically unsaturated carboxylic acid, an acrylic acid-based crosslinked polymer may be added thereto, or after mixing the emulsified solution of polyamide-based rubber-like elastomer with an acrylic acid-based crosslinked polymer, a copolymer of ethylene with an ethylenically unsaturated carboxylic acid may be added thereto. Alternatively, after mixing an acrylic acid-based crosslinked polymer with an aqueous dispersion of a copolymer of, ethylene and an ethylenically unsaturated carboxylic acid, this mixture may be added to and mixed with the emulsified solution of polyamide-based rubber-like elastomer. For mixing an acrylic acid-based crosslinked polymer with a copolymer of ethylene and an ethylenically unsaturated carboxylic acid in advance, a container equipped with a stirrer is preferably used to apply a shearing force to these components.

Advantageous Effect of the Invention

The aqueous dispersion of polyamide-based rubber-like elastomer of the present invention is excellent in storage stability, particularly at low temperatures, and is thus easy to handle in cold weather regions in particular. Furthermore, the aqueous dispersion of polyamide-based rubber-like elastomer of the present invention, when used as, for example, a coating material, can be uniformly applied only onto the surface of a substrate. Thus, the aqueous dispersion of polyamide-based rubber-like elastomer of the present invention is less likely to permeate into a product coated with the aqueous dispersion, and an antioxidant contained in the processed product is thus not hindered from producing its effect, thereby resulting in a product that is excellent in mechanical properties, such as heat resistance and flexibility.

Therefore, the aqueous dispersion of polyimide-based rubber-like elastomer of the present invention can be particularly favorably used as a coating material for nylon fabrics, polyester fabrics and the like that are used in garment materials, carpets, airbags, etc.

DESCRIPTION OF EMBODIMENTS

The present invention is explained in detail below with reference to Examples.

Example 1

160 g of a polyether-block amide copolymer (tradename: UBESTAXPA 9040F1, manufactured by Ube Industries, Ltd.; melting point: 140° C.), 214 g of deionized water, 16 g of ethylene oxide/propylene oxide copolymer (tradename: Pluronic F-108, manufactured by ADEKA Corporation; weight average molecular weight: 15,500; ethylene oxide content: 80 wt %) and 6.4 g of 1,6-hexandiol-bis[3-(3,5-di-t-butyl-4-hydroxyphenyl)propionate] (tradename: Irganox 259, manufactured by BASF Japan Ltd.) were placed in a 1-liter pressure-resistant autoclave equipped with turbine impellers of 50 mm in diameter and the autoclave was then closed. Subsequently, a stirring apparatus was started and the inside of the autoclave was heated to 180° C. while stirring the mixture at 500 rpm. While maintaining the internal temperature at 180° C., the mixture was further stirred for 15 minutes. Thereafter, the contents were cooled to room temperature, thereby giving an emulsified solution of polyamide-based rubber-like elastomer.

36.0 g of an aqueous dispersion of ammonium salt of ethylene/acrylic acid copolymer (tradename: Zaikthene A, manufactured by Sumitomo Seika Chemicals Co., Ltd.; solids content: 25%; copolymerization ratio of the acrylic acid: 21.1%) and 30.4 g of a 2 wt % aqueous solution of acrylic acid-based crosslinked polymer (tradename: Aqupec HV-805EG, manufactured by Sumitomo Seika Chemicals Co., Ltd.; polyacrylic acid content: 99%; a 0.2 wt % aqueous solution thereof adjusted to a pH of 7.0 using sodium hydrate had a viscosity of 21,000 mPa·s measured with a B-type rotational viscometer at 25° C. at a rotation speed of 20 rpm) were added to the resulting emulsified solution. Thereafter, using an aqueous sodium hydroxide solution, the aqueous dispersion was adjusted to have a pH of 9.8 and a solids content of 40%. 0.2 g of colorant (iron oxide red) was then added thereto. The result was mixed by stirring using a homomixer (tradename: TK Homomixer M-model, manufactured by Tokushu Kika Kogyo Co., Ltd.) at 4,500 rpm for 5 minutes, thereby giving an aqueous dispersion of the polyamide-based rubber-like elastomer of the present invention.

The resulting aqueous dispersion of polyamide-based rubber-like elastomer was placed in a thermostatic chamber that was preset to 25° C. The viscosity of the dispersion was measured 48 hours later, revealing that the viscosity measured with a B-type viscometer at 25° C. and 60 rpm was 1,210 mPa·s and that at 25° C. and 6 rpm was 2,840 mPa·s.

Example 2

An aqueous dispersion of polyamide-based rubber-like elastomer was obtained in the same manner as in Example 1 except that the amount of the aqueous dispersion of ammonium salt of ethylene/acrylic acid copolymer (tradename: Zaikthene A, manufactured by Sumitomo Seika Chemicals Co., Ltd.) was changed to 39.9 g. The resulting aqueous dispersion of polyamide-based rubber-like elastomer had a viscosity measured at 25° C. and 60 rpm of 1,360 mPa·s and that at 25° C. and 6 rpm of 3,130 mPa·s.

Example 3

An aqueous dispersion of polyamide-based rubber-like elastomer was obtained in the same manner as in Example 1 except that the amount of the aqueous dispersion of ammonium salt of ethylene/acrylic acid copolymer (tradename: Zaikthene A, manufactured by Sumitomo Seika Chemicals Co., Ltd.) was changed to 32.1 g. The resulting aqueous dispersion of polyamide-based rubber-like elastomer had a viscosity measured at 25° C. and 60 rpm of 900 mPa·s and that at 25° C. and 6 rpm of 2,160 mPa·s.

Example 4

An aqueous dispersion of polyamide-based rubber-like elastomer was obtained in the same manner as in Example 1 except that the amount of the aqueous dispersion of ammonium salt of ethylene/acrylic acid copolymer (tradename: Zaikthene A, manufactured by Sumitomo Seika Chemicals Co., Ltd.) was changed to 6.4 g. The resulting aqueous dispersion of polyamide-based rubber-like elastomer had a viscosity measured at 25° C. and 60 rpm of 750 mPa·s and that at 25° C. and 6 rpm of 1,990 mPa·s.

Example 5

An aqueous dispersion of polyamide-based rubber-like elastomer was obtained in the same manner as in Example 1 except that the amount of the aqueous dispersion of ammonium salt of ethylene/acrylic acid copolymer (tradename: Zaikthene A, manufactured by Sumitomo Seika Chemicals Co., Ltd.) was changed to 64.3 g. The resulting aqueous dispersion of polyamide-based rubber-like elastomer had a viscosity measured at 25° C. and 60 rpm of 1,500 mPa·s and that at 25° C. and 6 rpm of 3,300 mPa·s.

Example 6

An aqueous dispersion of polyamide-based rubber-like elastomer was obtained in the same manner as in Example 1 except that the pH of the aqueous dispersion was changed to 8.5. The resulting aqueous dispersion of polyamide-based rubber-like elastomer had a viscosity measured at 25° C. and 60 rpm of 1,320 mPa·s and that at 25° C. and 6 rpm of 3,200 mPa·s.

Example 7

An aqueous dispersion of polyamide-based rubber-like elastomer was obtained in the same manner as in Example 1 except that the pH of the aqueous dispersion was adjusted to 11.5. The resulting aqueous dispersion of polyamide-based rubber-like elastomer had a viscosity measured at 25° C. and 60 rpm of 1,100 mPa·s and that at 25° C. and 6 rpm of 2,590 mPa·s.

Example 8

An aqueous dispersion of polyamide-based rubber-like elastomer was obtained in the same manner as in Example 1 except that the 2 wt % aqueous solution of acrylic acid-based crosslinked polymer (tradename: Aqupec HV-805EG, manufactured by Sumitomo Seika Chemicals Co., Ltd.) was not used. The resulting aqueous dispersion of polyamide-based rubber-like elastomer had a viscosity measured at 25° C. and 60 rpm of 220 mPa·s and that at 25° C. and 6 rpm of 290 mPa·s.

Example 9

An aqueous dispersion of polyamide-based rubber-like elastomer was obtained in the same manner as in Example 1 except that the amount of the 2 wt % aqueous solution of acrylic acid-based crosslinked polymer (tradename: Aqupec HV-805EG, manufactured by Sumitomo Seika Chemicals Co., Ltd.) was changed to 11.2 g. The resulting aqueous dispersion of polyamide-based rubber-like elastomer had a viscosity measured at 25° C. and 60 rpm of 500 mPa·s and that at 25° C. and 6 rpm of 720 mPa·s.

Example 10

An aqueous dispersion of polyamide-based rubber-like elastomer was obtained in the same manner as in Example 1 except that the amount of the 2 wt % aqueous solution of acrylic acid-based crosslinked polymer (tradename: Aqupec HV-805EG, manufactured by Sumitomo Seika Chemicals Co., Ltd.) was changed to 34.4 g. The resulting aqueous dispersion of polyamide-based rubber-like elastomer had a viscosity measured at 25° C. and 60 rpm of 2,970 mPa·s and that at 25° C. and 6 rpm of 8,400 mPa·s.

Example 11

An aqueous dispersion of polyamide-based rubber-like elastomer was obtained in the same manner as in Example 1 except that 30.4 g of 5 wt % aqueous solution of carboxymethylcellulose (tradename: CMC-1380, manufactured by Daicel Chemical Industries, Ltd.; having a viscosity measured with a B-type rotational viscometer at 25° C. and 60 rpm of 6,000 mPa·s) was used instead of the 2 wt % aqueous solution of acrylic acid-based crosslinked polymer (tradename: Aqupec HV-805EG, manufactured by Sumitomo Seika Chemicals Co., Ltd.). The resulting aqueous dispersion of polyamide-based rubber-like elastomer had a viscosity measured at 25° C. and 60 rpm of 1,300 mPa·s and that at 25° C. and 6 rpm of 1,950 mPa·s.

Example 12

160 g of a polyether ester block amide copolymer (tradename: Pebax 2533 SN01; melting point: 134° C., manufactured by Arkema, Ltd.), 6.4 g of 1,6-hexandiol-bis[3-(3,5-di-t-butyl-4-hydroxyphenyl)propionate] (tradename: Irganox 259, manufactured by BASF Japan Ltd.), 1,230 g of toluene, and 610 g of isopropyl alcohol were placed in a 5,000-mL separable flask. The mixture was dissolved by stirring at 80° C. for 4 hours.

An aqueous solution obtained by dissolving 16 g of potassium oleate in 1,000 g of water was added to the resulting organic solution. The resulting mixture was mixed by stirring for 6 minutes using a homomixer (tradename: TK Homomixer Type SL, manufactured by Tokushu Kika Kogyo Co., Ltd.), thereby giving an emulsified turbid solution. The number of revolutions and temperature during mixing by stirring were set to 9,000 rpm and 40° C., respectively.

The resulting emulsified turbid solution was heated to 40 to 70° C. at a reduced pressure of 40 to 90 kPa, thereby evaporating off the toluene, isopropyl alcohol and water to obtain an emulsified solution of polyamide-based rubber-like elastomer having a solids content of 46%.

36.0 g of an aqueous dispersion of ammonium salt of ethylene/acrylic acid copolymer (tradename: Zaikthene A, manufactured by Sumitomo Seika Chemicals Co., Ltd.; solids content: 25%; copolymerization ratio of the acrylic acid: 21.1%) and 30.4 g of a 2 wt % aqueous solution of acrylic acid-based crosslinked polymer (tradename: Aqupec HV-805EG, manufactured by Sumitomo Seika Chemicals Co., Ltd., polyacrylic acid content: 99%; a 0.2 wt % aqueous solution thereof adjusted to a pH of 7.0 using sodium hydrate had a viscosity of 21,000 mPa·s measured with a B-type rotational viscometer at 25° C. at a rotation speed of 20 rpm) were added to the resulting emulsified solution. Thereafter, using an aqueous sodium hydroxide solution, the aqueous dispersion was adjusted to have a pH of 9.8 and solids content of 40%. 0.2 g of colorant (iron oxide red) was then added thereto. The result was mixed by stirring using a homomixer (tradename: TK Homomixer M-model, manufactured by Tokushu Kika Kogyo Co., Ltd.) at 4,500 rpm for 5 minutes, thereby giving an aqueous dispersion of the polyamide-based rubber-like elastomer of the present invention.

The resulting aqueous dispersion of polyamide-based rubber-like elastomer was placed in a thermostatic chamber that was preset at 25° C. The viscosity of the dispersion was measured 48 hours later, revealing that the viscosity measured with a B-type rotational viscometer at 25° C. and 60 rpm was 970 mPa·s and that at 25° C. and 6 rpm was 2,400 mPa·s.

Comparative Example 1

An aqueous dispersion of polyamide-based rubber-like elastomer was obtained in the same manner as in Example 1 except that the aqueous dispersion of ammonium salt of ethylene/acrylic acid copolymer (tradename: Zaikthene A, manufactured by Sumitomo Seika Chemicals Co., Ltd.) was not used. The resulting aqueous dispersion of polyamide-based rubber-like elastomer had a viscosity measured at 25° C. and 60 rpm of 670 mPa·s and that at 25° C. and 6 rpm of 2,200 mPa·s.

Comparative Example 2

An aqueous dispersion of polyamide-based rubber-like elastomer was obtained in the same manner as in Example 1 except that the amount of the aqueous dispersion of ammonium salt of ethylene/acrylic acid copolymer (tradename: Zaikthene A, manufactured by Sumitomo Seika Chemicals Co., Ltd.) was changed to 3.9 g. The resulting aqueous dispersion of polyamide-based rubber-like elastomer had a viscosity measured at 25° C. and 60 rpm of 730 mPa·s and that at 25° C. and 6 rpm of 2,000 mPa·s.

Comparative Example 3

An aqueous dispersion of polyamide-based rubber-like elastomer was obtained in the same manner as in Example 1 except that the amount of the aqueous dispersion of ammonium salt of ethylene/acrylic acid copolymer (tradename: Zaikthene A, manufactured by Sumitomo Seika Chemicals Co., Ltd.) was changed to 77.1 g. The resulting aqueous dispersion of polyamide-based rubber-like elastomer had a viscosity measured at 25° C. and 60 rpm of 1,530 mPa·s and that at 25° C. and 6 rpm of 3,290 mPa·s.

Evaluation of Aqueous Dispersion
(Low-Temperature Stability)

Each of the polyamide-based rubber-like elastomer aqueous dispersions obtained in Examples 1 to 12 and Comparative Examples 1 to 3 was placed in a thermostatic chamber that was preset to 2° C. and maintained therein for 240 hours. The polyamide-based rubber-like elastomer aqueous dispersion was transferred into another thermostatic chamber that was preset to 25° C. and maintained at 25° C. for 3 hours. Thereafter, the viscosity of the polyamide-based rubber-like elastomer aqueous dispersion was measured with a B-type rotational viscometer at a rotation speed of 60 rpm to evaluate the low-temperature stability. More specifically, with the viscosity of the aqueous dispersion measured at a rotation speed of 60 rpm before storing in the thermostatic chamber at 2° C.

[Criteria for Evaluating the Heat Resistance of Processed Product]

Excellent: No uneven coating, discoloration, or cracking is observed on the surface of the coated film.

Fair: Slight uneven coating, discoloration, or cracking is observed on the surface of the coated film, but almost indistinguishable.

Poor: Discoloration, uneven coating, or cracking is clearly observed on the surface of the coated film.

[Criteria for Evaluating the Flexibility of Processed Product]

Excellent: Excellent flexibility in the nylon cloth.

Fair: Slight hardness, but flexibility of the nylon cloth is maintained.

Poor: Clear hardness in the nylon cloth.

TABLE 1

| | Immediately after production (Viscosity at 25° C.) | | | After low-temperature treatment (2° C. × 240 Hr) | | Heat-aging test | |
|---|---|---|---|---|---|---|---|
| | Viscosity at 60 rpm (mpa · S) | Viscosity at 6 rpm (mpa · S) | Structural viscosity coefficient | Viscosity at 60 rpm (mpa · S) | Stability | Heat resistance (appearance) | Flexibility (tactile feeling) |
| Example 1 | 1210 | 2840 | 2.35 | 1280 | Excellent | Excellent | Excellent |
| Example 2 | 1360 | 3130 | 2.30 | 1380 | Excellent | Excellent | Excellent |
| Example 3 | 900 | 2160 | 2.40 | 1060 | Excellent | Excellent | Excellent |
| Example 4 | 750 | 1990 | 2.65 | 950 | Fair | Excellent | Excellent |
| Example 5 | 1500 | 3300 | 2.20 | 1700 | Excellent | Excellent | Fair |
| Example 6 | 1320 | 3200 | 2.42 | 1740 | Fair | Excellent | Excellent |
| Example 7 | 1100 | 2590 | 2.35 | 1330 | Fair | Excellent | Excellent |
| Example 8 | 220 | 290 | 1.32 | 250 | Excellent | Fair | Excellent |
| Example 9 | 500 | 720 | 1.44 | 550 | Excellent | Fair | Excellent |
| Example 10 | 2970 | 8400 | 2.83 | 3260 | Excellent | Fair | Excellent |
| Example 11 | 1300 | 1800 | 1.38 | 1630 | Fair | Fair | Excellent |
| Example 12 | 970 | 2400 | 2.47 | 1100 | Excellent | Excellent | Excellent |
| Comparative Example 1 | 670 | 2200 | 3.28 | 980 | Unstable | Fair | Excellent |
| Comparative Example 2 | 730 | 2000 | 2.75 | 1220 | Unstable | Fair | Excellent |
| Comparative Example 3 | 1530 | 3290 | 2.15 | 1750 | Excellent | Excellent | Poor | being 100, the relative value for the viscosity measured after storing at 2° C. for 240 hours was calculated. The low-temperature stability was evaluated based on the criteria described below.

[Evaluation Criteria for Low-Temperature Stability]
Excellent: less than 120
Fair: exceeding 120 and less than 140
Unstable: exceeding 140

(Heat Resistance and Flexibility of Processed Product)

Each of the polyamide-based rubber-like elastomer aqueous dispersions obtained in Examples 1 to 12 and Comparative Examples 1 to 3 was applied to a woven fabric cut into a size of 15 cm×15 cm (plain weave, warp: 46 yarns/inch, weft: 46 yarns/inch, Nylon 66 multiple wound yarns having a total fineness of 470 dtex) using a bar coater (No. 4). Each sample was heat treated at 180° C. for 2 minutes to fix the aqueous dispersion to obtain a nylon cloth having a polyamide-based rubber-like elastomer coated on the surface thereof.

Subsequently, each resulting nylon cloth was maintained at 120° C. in a hot air dryer for 400 hours. The appearance of the outer surface of the nylon cloth was observed with a scanning electron microscope (trade name: JSM-6390LA manufactured by JEOL Ltd.) before and after drying to evaluate the heat resistance of the nylon cloth. The flexibility of the nylon cloth was measured according to the tactile feeling when bending the nylon cloth by hand.

As is clear from Table 1, the aqueous dispersion of polyamide-based rubber-like elastomer of the present invention has excellent storage stability at low temperatures. Furthermore, use of the aqueous dispersion as a coating material enables the production of a processed product having excellent mechanical strength, such as heat resistance and flexibility.

In contrast, the aqueous dispersion of Comparative Example 1, which does not contain an ammonium salt of ethylene/acrylic acid copolymer, and the aqueous dispersion of Comparative Example 2, which contains a small amount of ammonium salt of ethylene/acrylic acid copolymer, exhibited inferior storage stability at low temperatures. The processed product obtained using the aqueous dispersion of Comparative Example 3, which contains an excessive amount of ammonium salt of ethylene/acrylic acid copolymer, exhibited inferior mechanical properties, such as flexibility.

The invention claimed is:

1. An aqueous dispersion of polyamide-based rubber-like elastomer comprising an aqueous dispersion containing a polyamide-based rubber-like elastomer emulsified and dispersed therein,
   the aqueous dispersion comprising a copolymer of ethylene with an ethylenically unsaturated carboxylic acid in an amount of 0.8 to 10 parts by weight per 100 parts by weight of the polyamide-based rubber-like elastomer.

2. The aqueous dispersion of polyamide-based rubber-like elastomer according to claim 1, wherein the aqueous dispersion is one prepared by emulsifying and dispersing the polyamide-based rubber-like elastomer in an aqueous medium in the presence of the aqueous medium and a surfactant.

3. The aqueous dispersion of polyamide-based rubber-like elastomer according to claim 1, wherein the polyamide-based rubber-like elastomer is at least one copolymer selected from the group consisting of a polyether block amide copolymer and a polyether ester block amide copolymer.

4. The aqueous dispersion of polyamide-based rubber-like elastomer according to claim 1, further comprising an acrylic acid-based crosslinked polymer.

5. The aqueous dispersion of polyamide-based rubber-like elastomer according to claim 1, having a pH of 9 to 11 at 25° C.

6. The aqueous dispersion of polyamide-based rubber-like elastomer according to claim 1, having a viscosity of 600 to 3,000 mPa·s at 25° C., and having a structural viscosity coefficient of 1.5 to 2.7, the structural viscosity coefficient being defined by the following formula:

$$\text{Structural Viscosity Coefficient} = \text{Viscosity at 6 rpm} / \text{Viscosity at 60 rpm},$$

wherein each viscosity is measured with a B-type viscometer at 25° C. at a rotation speed of 60 rpm or 6 rpm.

7. A process for producing an aqueous dispersion of polyamide-based rubber-like elastomer, the process comprising the steps of:

preparing a mixture comprising a polyamide-based rubber-like elastomer, a surfactant, and an aqueous medium;

heating the obtained mixture to a temperature equal to or higher than the softening temperature of the polyamide-based rubber-like elastomer and emulsifying the mixture; and adding to the obtained emulsified solution a copolymer of ethylene with an ethylenically unsaturated carboxylic acid in an amount of 0.8 to 10 parts by weight per 100 parts by weight of the polyamide-based rubber-like elastomer.

8. A process for producing an aqueous dispersion of polyamide-based rubber-like elastomer, the process comprising the steps of:

mixing an organic phase solution comprising a polyamide-based rubber-like elastomer dissolved in an organic solvent with an aqueous phase solution comprising a surfactant dissolved in an aqueous medium to thereby obtain an emulsified turbid solution;

evaporating off the organic solvent from the emulsified turbid solution to obtain an emulsified solution; and adding to the obtained emulsified solution a copolymer of ethylene with an ethylenically unsaturated carboxylic acid in an amount of 0.8 to 10 parts by weight per 100 parts by weight of the polyamide-based rubber-like elastomer.

* * * * *